United States Patent
Yagyu (10) Patent No.: US 11,607,954 B2
(45) Date of Patent: Mar. 21, 2023

(54) HYBRID POWER TRANSMISSION MECHANISM

(71) Applicant: KUBOTA CORPORATION, Osaka (JP)

(72) Inventor: Sumio Yagyu, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/833,977

(22) Filed: Jun. 7, 2022

(65) Prior Publication Data
US 2023/0030819 A1 Feb. 2, 2023

(30) Foreign Application Priority Data

Jul. 28, 2021 (JP) .............................. JP2021-123457

(51) Int. Cl.
| | | |
|---|---|---|
| *B60K 6/383* | (2007.10) | |
| *B60K 25/02* | (2006.01) | |
| *F16H 37/06* | (2006.01) | |
| *F02N 11/04* | (2006.01) | |

(Continued)

(52) U.S. Cl.
CPC .............. *B60K 25/02* (2013.01); *B60K 6/365* (2013.01); *B60K 6/383* (2013.01); *B60K 6/387* (2013.01);
(Continued)

(58) Field of Classification Search
CPC ....... B60K 6/20–547; F16H 2200/2005–2017; F16H 2200/2035–2061; F16H 3/724;
(Continued)

(56) References Cited

U.S. PATENT DOCUMENTS

| | | | |
|---|---|---|---|
| 2004/0166980 A1* | 8/2004 | Supina ............ | B60W 30/18027 903/910 |
| 2009/0093330 A1* | 4/2009 | Kumazaki .............. | B60K 6/365 475/5 |

(Continued)

FOREIGN PATENT DOCUMENTS

| | | |
|---|---|---|
| DE | 102015213109 | 1/2017 |
| DE | 102020003597 | 9/2020 |

(Continued)

OTHER PUBLICATIONS

Extended European Search Report issued in Corresponding EP Patent Application No. 22177695.8, dated Nov. 3, 2022.

*Primary Examiner* — Ernesto A Suarez
*Assistant Examiner* — Lillian T Nguyen
(74) *Attorney, Agent, or Firm* — Greenblum & Bernstein, P.L.C.

(57) ABSTRACT

A hybrid power transmission mechanism includes an engine; a motor/generator having a rotor and a stator; a driven machine; a planetary gear mechanism having a sun gear, an internal gear drivingly connected to the rotor, a planetary gear, and a planetary carrier shaft including first and second extension shaft parts extending from the planetary gear in opposite directions; a first clutch switchable between a state of allowing transmission of power between the first shaft and the internal gear and a state of not allowing transmission of power therebetween; and a second clutch switchable between a state of allowing rotation of the sun gear and a state of not allowing rotation thereof. A first shaft that outputs power of the engine and a second shaft that inputs power to the driven machine are drivingly connected to the first and second extension shaft parts of the planetary carrier shaft, respectively.

7 Claims, 3 Drawing Sheets

(51) Int. Cl.
  *F02N 11/08* (2006.01)
  *B60K 6/387* (2007.10)
  *B60K 6/365* (2007.10)
  *B60K 6/40* (2007.10)
  *B60K 6/485* (2007.10)
  *B60K 6/547* (2007.10)
  *F16H 3/72* (2006.01)

(52) U.S. Cl.
  CPC ............... *B60K 6/40* (2013.01); *B60K 6/485* (2013.01); *B60K 6/547* (2013.01); *F02N 11/04* (2013.01); *F02N 11/0851* (2013.01); *F02N 11/0859* (2013.01); *F16H 3/724* (2013.01); *F16H 37/065* (2013.01); *B60K 2025/024* (2013.01); *B60Y 2200/92* (2013.01)

(58) Field of Classification Search
  CPC ..... F16H 3/72; F16H 2200/2084–2092; F16H 2200/2069–2076
  See application file for complete search history.

(56) References Cited

U.S. PATENT DOCUMENTS

| | | | |
|---|---|---|---|
| 2011/0027105 A1* | 2/2011 | Haupt | F16H 61/0025 417/326 |
| 2011/0300983 A1* | 12/2011 | Kurokawa | F16H 3/725 475/5 |
| 2012/0052999 A1* | 3/2012 | Kim | F16H 3/728 180/65.22 |
| 2017/0129322 A1 | 5/2017 | Yagyu et al. | |
| 2019/0351751 A1 | 11/2019 | Sato et al. | |

FOREIGN PATENT DOCUMENTS

| | | | |
|---|---|---|---|
| JP | 2003-19911 | 1/2003 | |
| WO | WO-2011138892 A1 * | 11/2011 | ............ B60K 6/365 |
| WO | 2015/194419 A1 | 12/2015 | |

* cited by examiner

HYBRID POWER TRANSMISSION MECHANISM

CROSS REFERENCE TO RELATED APPLICATIONS

This application claims the benefit of priority to Japanese Patent Application No. 2021-123457 filed on Jul. 28, 2021. The entire contents of this application are hereby incorporated herein by reference.

BACKGROUND OF THE INVENTION

1. Field of the Invention

The present invention relates to a hybrid power transmission mechanism capable of transmitting power of a combination of a motor/generator and an engine to a driven machine.

2. Description of the Related Art

In the related art, the hybrid power transmission mechanism disclosed in WO2015/194419 has been known.

The hybrid power transmission mechanism disclosed in WO2015/194419 mentioned above includes an engine; a crankshaft provided in the engine; a motor/generator; a driven machine to which power of the motor/generator is to be transmitted; an input shaft provided in the driven machine; a flywheel coupled to the crankshaft; an elastic coupling that couples the flywheel and the input shaft to each other; and a rotor provided in the motor/generator and coupled to the flywheel.

SUMMARY OF THE INVENTION

According to the hybrid power transmission mechanism disclosed in WO2015/194419 mentioned above, power of a combination of the motor/generator and the engine can be transmitted to the driven machine. The hybrid power transmission mechanism, however, does not have a configuration capable of switching between a state in which the motor/generator functions as a starter motor that starts the engine and a state in which the motor/generator functions as an assist motor that assists power of the engine or as a generator that generates power by the power of the engine.

The present invention has been made in consideration of the aforementioned circumstance and provides a hybrid power transmission mechanism capable of easily and reliably switching between a state in which a motor/generator functions as a starter motor and a state in which the motor/generator functions as an assist motor or as a generator.

Technical means adopted by the present invention to solve the aforementioned circumstance is characterized in the following points.

A hybrid power transmission mechanism according to one aspect of the present invention includes an engine; a motor/generator having a rotor and a stator; a driven machine to which power from the engine and/or the motor/generator is to be transmitted; a planetary gear mechanism having a sun gear, an internal gear, a planetary gear that meshes with the sun gear and the internal gear, and a planetary carrier shaft that supports the planetary gear rotatably around the sun gear; a first clutch; and a second clutch. The planetary carrier shaft includes a first extension shaft part and a second extension shaft part extending from the planetary gear in opposite directions along a rotational axis direction of the planetary gear. A first shaft that outputs power of the engine is drivingly connected to the first extension shaft part of the planetary carrier shaft, and a second shaft that inputs power to the driven machine is drivingly connected to the second extension shaft part of the planetary carrier shaft. The internal gear is drivingly connected to the rotor. The first clutch is switchable between a connected state of allowing transmission of power between the first shaft and the internal gear and a disconnected state of not allowing transmission of power between the first shaft and the internal gear. The second clutch is switchable between an allowing state of allowing rotation of the sun gear and a blocking state of not allowing rotation of the sun gear.

Also, it may be configured such that the hybrid power transmission mechanism includes a speed changing mechanism that reduces a speed of rotation of the internal gear and transmits the speed-reduced rotation of the internal gear to the first shaft when the first clutch is in the connected state.

Also, it may be configured such that the speed changing mechanism is capable of increasing the speed of rotation of the first shaft and transmitting the speed-increased rotation of the first shaft to the internal gear when the first clutch is in the connected state.

Also, it may be configured such that the speed changing mechanism has a first gear, a second gear that is drivingly connected to the first gear and rotates synchronously with the first gear, and a third gear that has a larger number of teeth than the second gear and meshes with the second gear, the first gear meshes with the internal gear, and the third gear is capable of being drivingly connected to the first shaft via the first clutch.

Also, it may be configured such that the internal gear has first internal teeth and second internal teeth, the first internal teeth mesh with the first gear, and the second internal teeth mesh with the planetary gear.

Also, it may be configured such that the hybrid power transmission mechanism includes a controller that controls operation of the first clutch and the second clutch, and the controller causes the first clutch to be in the connected state and causes the second clutch to be in the allowing state when the motor/generator is actuated as a starter motor that starts the engine, and causes the first clutch to be in the disconnected state and causes the second clutch to be in the blocking state when the motor/generator is actuated as an assist motor that assists power of the engine or as a generator that generates power by the power of the engine.

Also, it may be configured such that each of the first clutch and the second clutch is a one-way clutch, the rotor rotates in a first direction when the motor/generator is actuated as a starter motor that starts the engine and rotates in a second direction when the motor/generator is actuated as an assist motor that assists power of the engine or as a generator that generates power by the power of the engine, the first clutch enters the connected state when the rotor rotates in the first direction and enters the disconnected state when the rotor rotates in the second direction, and the second clutch enters the allowing state when the rotor rotates in the first direction and enters the blocking state when the rotor rotates in the second direction.

Also, it may be configured such that, when the rotor rotates in the first direction, the first clutch enters the connected state before a rotational speed of the first shaft reaches a predetermined rotational speed and enters the disconnected state when the rotational speed of the first shaft reaches the predetermined rotational speed.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, a suitable embodiment of the present invention will be described with reference to the drawings.

Figure 1:
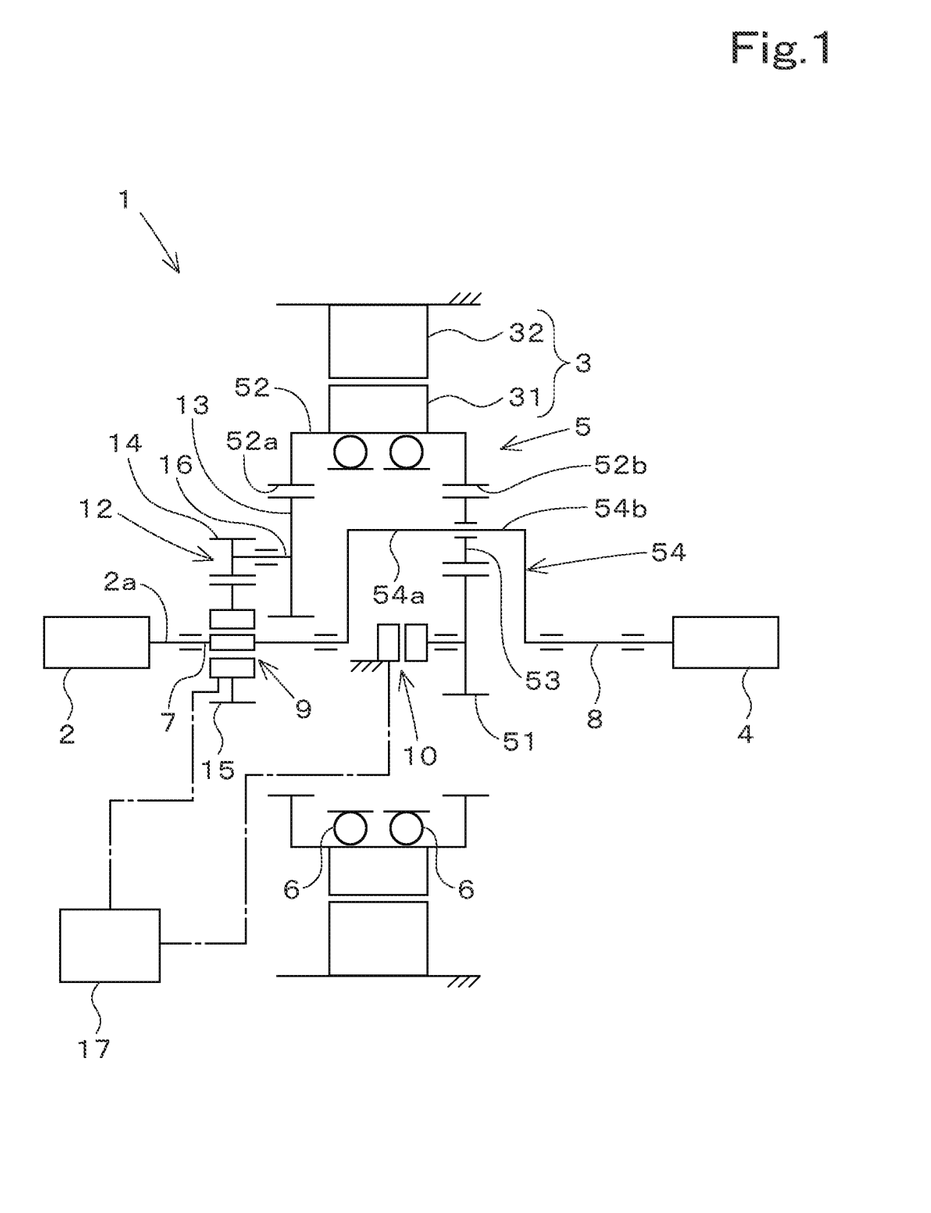
FIG. 1 is an overall diagram illustrating one example of a hybrid power transmission mechanism according to the present invention.

FIG. 1 is an overall diagram illustrating one example of a hybrid power transmission mechanism 1 (hereinafter sometimes simply referred to as the "power transmission mechanism 1") according to the present invention. Hereinafter, for convenience of description, an axial direction (the leftward direction in FIG. 1) from a driven machine 4 toward an engine 2 is referred to as a first axial direction, and an axial direction (the rightward direction in FIG. 1) from the engine 2 toward the driven machine 4 is referred to as a second axial direction. A side of each component member of the power transmission mechanism 1 facing in the first axial direction is referred to a first axial directional side, and another side of each component member of the power transmission mechanism 1 facing in the second axial direction is referred to a second axial directional side.

The power transmission mechanism 1 includes the engine 2, a motor/generator 3, the driven machine 4, and a planetary gear mechanism 5.

The engine 2 is a diesel engine, a gasoline engine, or the like. The engine 2 is provided with a crankshaft 2a that outputs power of the engine 2. The crankshaft 2a faces and projects toward the driven machine 4 (in the second axial direction).

The motor/generator 3 has a rotor 31 and a stator 32. The stator 32 has an annular shape. The rotor 31 is disposed on the inner peripheral side of the stator 32. The rotor 31 rotates relative to the stator 32.

As the motor/generator 3, for example, a three-phase AC synchronous motor of an interior permanent magnet type is used. However, the motor/generator 3 is not limited thereto. For example, the motor/generator 3 may be a synchronous motor or the like in which a laminated steel sheet around which a coil is wound is fitted to a rotor. Alternatively, the motor/generator 3 may be an alternating-current motor or a direct-current motor.

The motor/generator 3 functions as a motor in response to current being caused to flow through the coil of the stator 32 and causing the rotor 31 to rotate. The motor/generator 3 also functions as a generator in response to the rotor 31 being rotated and causing an electromotive force to be generated in the stator 32.

In the power transmission mechanism 1, the motor/generator 3 can be actuated as a starter motor that starts the engine 2. In addition, the motor/generator 3 can be actuated as an assist motor that assists power of the engine 2. Further, the motor/generator 3 can be actuated as a generator that generates power by the power of the engine 2.

The driven machine 4 is driven by receiving power from the engine 2 and/or the motor/generator 3. The driven machine 4 is, for example, a hydraulic pump. Specifically, an example of the driven machine 4 is a hydrostatic-transmission hydraulic pump. The driven machine 4 is, however, not limited to a hydraulic pump and may be a transmission or the like.

The planetary gear mechanism 5 has a sun gear 51, an internal gear 52, a planetary gear 53, and a planetary carrier shaft 54. The planetary gear mechanism 5 is disposed on the inner peripheral side of the rotor 31 of the motor/generator 3. The outer peripheral surface of the internal gear 52 is joined to the inner peripheral surface of the rotor 31. Consequently, the internal gear 52 and the rotor 31 are drivingly connected to each other so as to be rotatable integrally. The inner peripheral surface of the internal gear 52 is supported by a bearing 6. The internal gear 52 has first internal teeth 52a and second internal teeth 52b. The first internal teeth 52a and the second internal teeth 52b are disposed side by side on the first and second axial directional sides. The first internal teeth 52a are provided on the first axial directional side (closer to the engine 2). The second internal teeth 52b are provided on the second axial directional side (closer to the driven machine 4). The first internal teeth 52a and the second internal teeth 52b rotate integrally.

The sun gear 51 is disposed on the inner peripheral side of the internal gear 52. The rotation center (rotational axis) of the sun gear 51, the rotation center (rotational axis) of the rotor 31, and the rotation center (rotational axis) of the internal gear 52 are disposed on the same straight line. The planetary gear 53 meshes with the sun gear 51 and the internal gear 52 (the second internal teeth 52b of the internal gear 52). The planetary carrier shaft 54 supports the planetary gear 53 rotatably around the sun gear 51.

The planetary carrier shaft 54 extends in the first and second axial directions opposite to each other from the first and second axial directional sides of the planetary gear 53 along the rotational axis direction of the planetary gear 53. In the present embodiment, the planetary carrier shaft 54 passes through the center of the planetary gear 53 and extends in the first and second axial directions from the planetary gear 53. Hereinafter, a shaft part of the planetary carrier shaft 54 extending in the first axial direction from the first axial directional side of the planetary gear 53 along the rotational axis direction of the planetary gear 53 is referred to as a first extension shaft part 54a. A shaft part of the planetary carrier shaft 54 extending in the second axial direction from the second axial directional side of the planetary gear 53 along the rotational axis direction of the planetary gear 53 is referred to as a second extension shaft part 54b.

A first shaft 7 that outputs power of the engine 2 is drivingly connected to the first extension shaft part 54a. In the present embodiment, the first shaft 7 is drivingly connected to the crankshaft 2a of the engine 2. Alternatively, the first shaft 7 may be the crankshaft 2a of the engine 2. The first extension shaft part 54a and the first shaft 7 may be directly joined to each other and may be indirectly connected to each other via another shaft, a mechanism, or the like.

A second shaft 8 that inputs power to the driven machine 4 is drivingly connected to the second extension shaft part 54b. In the present embodiment, the second shaft 8 is an input shaft of the driven machine 4. Alternatively, the second shaft 8 may be another shaft drivingly connected to the input shaft of the driven machine 4. The second extension shaft part 54b and the second shaft 8 may be directly joined to each other and may be indirectly connected to each other via another shaft, a mechanism, or the like.

The power transmission mechanism 1 includes a first clutch 9 and a second clutch 10. The first clutch 9 and the second clutch 10 are each configured as an electromagnetic clutch. Each of the first clutch 9 and the second clutch 10 is, however, not limited to an electromagnetic clutch.

The first clutch 9 is switchable between a connected state of allowing transmission of power between the first shaft 7 and the internal gear 52 and a disconnected state of not allowing transmission of power between the first shaft 7 and the internal gear 52. This switching operation of the first clutch 9 can be executed by control by a controller 17 (described later).

The second clutch 10 is switchable between an allowing state of allowing rotation of the sun gear 51 and a blocking state of not allowing rotation of the sun gear 51. This switching operation of the second clutch 10 can be executed by control by the controller 17 (described later). One of two parts of the second clutch 10 that are switched between a connected state and a separated state is grounded, and the other is connected to the center shaft of the sun gear 51. Consequently, the second clutch 10 enters the blocking state when connected and enters the allowing state when separated.

The power transmission mechanism 1 includes a speed changing mechanism 12 that reduces a speed of rotation of the internal gear 52 and transmits the speed-reduced rotation to the first shaft 7 when the first clutch 9 is in the connected state.

The speed changing mechanism 12 has a first gear 13, a second gear 14, and a third gear 15. The first gear 13 meshes with the first internal teeth 52a of the internal gear 52. The second gear 14 is joined to the first gear 13 via an input gear shaft 16. The input gear shaft 16 is disposed parallel to the first shaft 7. The second gear 14 rotates synchronously with the first gear 13. The number of teeth of the first gear 13 is larger than the number of teeth of the second gear 14. The third gear 15 meshes with the second gear 14. The number of teeth of the third gear 15 is larger than the number of teeth of the second gear 14.

The third gear 15 is provided on the first shaft 7 via the first clutch 9 so as to be capable of being drivingly connected to the first shaft 7 via the first clutch 9. When the first clutch 9 is in the connected state, rotation of the third gear 15 is transmitted to the first shaft 7. When the first clutch 9 is in the disconnected state, rotation of the third gear 15 is not transmitted to the first shaft 7.

When the internal gear 52 rotates while the first clutch 9 is in the connected state, the first gear 13 that meshes with the first internal teeth 52a rotates. When the first gear 13 rotates, the second gear 14 rotates synchronously with the first gear 13 at the same speed. When the second gear 14 rotates, the third gear 15 that meshes with the second gear 14 rotates. At this time, the rotational speed (number of rotations) of the third gear 15 decreases compared with the rotational speed (number of rotations) of the second gear 14. Rotation of the third gear 15 is transmitted to the first shaft 7 via the first clutch 9. Consequently, a speed of rotation of the internal gear 52 is reduced and the speed-reduced rotation is transmitted to the first shaft 7.

The power transmission mechanism 1 includes the controller 17 that controls operation of the first clutch 9 and the second clutch 10. The controller 17 is a computer that includes an arithmetic operation unit, such as a CPU and the like, and a storage unit, such as a RAM, a ROM, and the like. The controller 17 controls operation of the first clutch 9 and the second clutch 10 in accordance with a control program and the like stored in the storage unit. The controller 17 is also capable of controlling driving of the engine 2. In addition, the controller 17 also capable of controlling rotational operation of the motor/generator 3. The controller 17 that performs each control described above may be formed by one device or may be formed by a plurality of devices.

The controller 17 is switchable between a state of causing the first clutch 9 to be in the connected state and the second clutch 10 to be in the allowing state and a state of causing the first clutch 9 to be in the disconnected state and the second clutch 10 to be in the blocking state.

Figure 2:
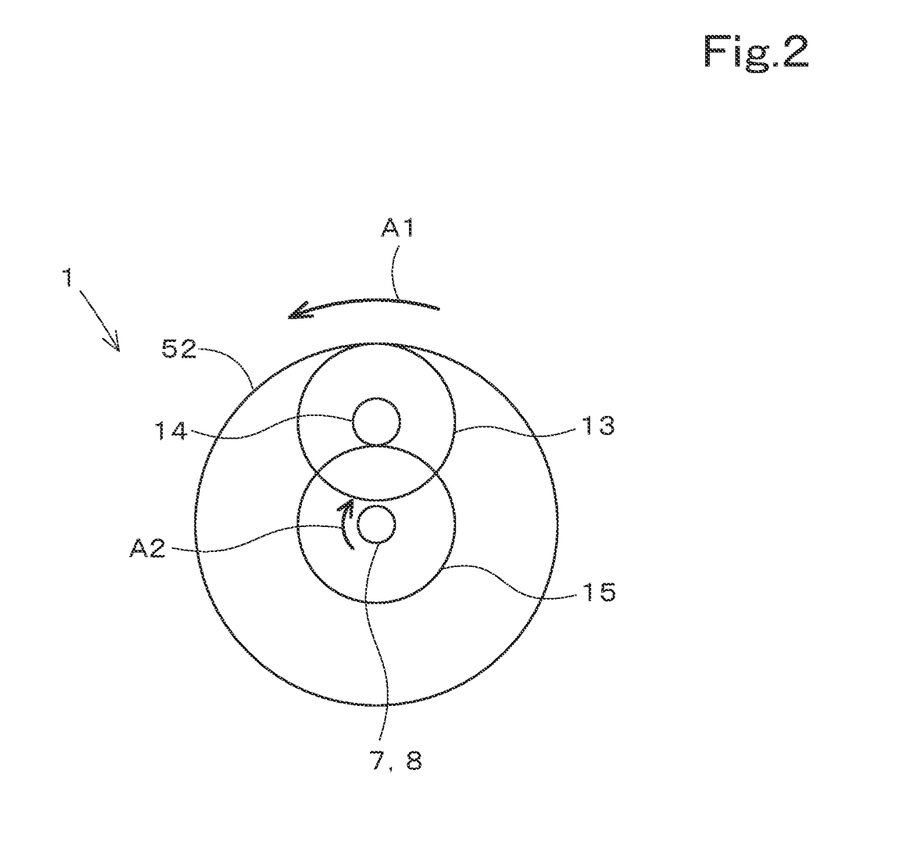
FIG. 2 is a diagram describing an operation (first operation) of the power transmission mechanism when a motor/generator is actuated as a starter motor that starts an engine.

When the motor/generator 3 is actuated as a starter motor that starts the engine 2, the controller 17 causes the first clutch 9 to be in the connected state and the second clutch 10 to be in the allowing state. Hereinafter, operation (first operation) of the power transmission mechanism 1 when the motor/generator 3 is actuated as a starter motor that starts the engine 2 will be described with reference to FIG. 2. FIG. 2 is a diagram in which the power transmission mechanism 1 is viewed in the first axial direction (leftward from the right end in FIG. 1).

When the motor/generator 3 is actuated as a starter motor that starts the engine 2, current is caused to flow through the coil of the stator 32, thereby rotating the rotor 31. The rotation direction of the rotor 31 at this time is referred to as a first rotational direction (refer to the arrow A1 in FIG. 2). The first direction is a leftward-rotation (counterclockwise) direction when the power transmission mechanism 1 is viewed in the first axial direction (leftward from the right end in FIG. 1).

When the rotor 31 rotates in the first rotational direction, the internal gear 52 connected to the rotor 31 rotates in the first rotational direction. When the internal gear 52 rotates in the first rotational direction, the first gear 13 and the second gear 14 also rotate in the first rotational direction. When the second gear 14 rotates in the first rotational direction, the third gear 15 rotates in a second rotational direction (the arrow A2 direction in FIG. 2), which is a rotational direction opposite the first rotational direction. The second rotational direction is a rightward-rotation (clockwise) direction when the power transmission mechanism 1 is viewed in the first axial direction (leftward from the right end in FIG. 1). Here, since the first clutch 9 is in the connected state, rotation of the third gear 15 is transmitted to the first shaft 7 via the first clutch 9. Consequently, the first shaft 7 rotates in the second direction, and the engine 2 is started.

In the first operation described above, since rotation of the rotor 31 and the internal gear 52 is reduced in speed and transmitted to the first shaft 7 by the speed changing mechanism 12, the rotational torque of the first shaft 7 increases compared with the rotational torque of the motor/generator 3. Therefore, rotational power having high torque is input from the first shaft 7 to the engine 2, which makes it possible to reliably start the engine 2. Consequently, actuating the motor/generator 3 as a starter motor does not require the use of a large motor/generator 3 having high output torque, which enables downsizing of the motor/generator 3.

Note that, since the second clutch 10 is in the allowing state when the aforementioned first operation is to be executed, the sun gear 51 freely rotates, and the planetary gear 53 revolves in the second rotational direction around the sun gear 51. Consequently, the planetary carrier shaft 54 rotates in the second rotational direction, and the second shaft 8 rotates together with the planetary carrier shaft 54 in the second rotational direction. Due to the sun gear 51 rotating freely, the second shaft 8 rotates similarly to when the planetary gear 53 is not present (while the rotation of the second shaft 8 is not restricted by the planetary gear 53). The rotational power of the second shaft 8 is input to the driven machine 4, and the driven machine 4 is driven.

Figure 3:
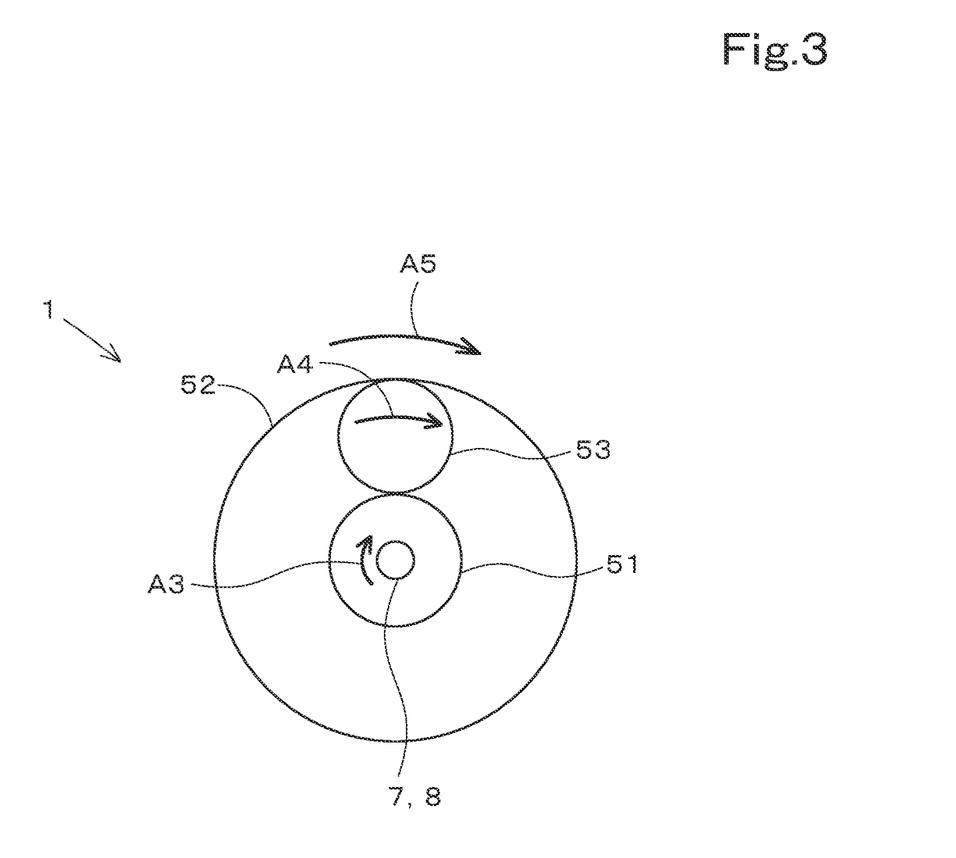
FIG. 3 is a diagram describing an operation (second operation) of the power transmission mechanism when the motor/generator is actuated as an assist motor that assists power of the engine or as a generator that generates power by the power of the engine.

When the motor/generator 3 is actuated as an assist motor that assists power of the engine 2 or as a generator that generates power by the power of the engine 2, the controller 17 causes the first clutch 9 to be in the disconnected state and the second clutch 10 to be in the blocking state. Hereinafter, operation (second operation) of the power transmission mechanism 1 when the motor/generator 3 is actuated as an assist motor that assists power of the engine 2 or as a generator that generates power by the power of the engine 2 will be described with reference to FIG. 3. FIG. 3 is a diagram in which the power transmission mechanism 1 is viewed in the first axial direction (leftward from the right end in FIG. 1).

When the motor/generator 3 is actuated as an assist motor that assists power of the engine 2 or as a generator that generates power by the power of the engine 2, the engine 2 is in a state of being driven. The first shaft 7 is rotated in the second rotational direction (the arrow A3 direction in FIG. 3) by the power of the engine 2. The rotation of the first shaft 7 is transmitted to the planetary carrier shaft 54. At this time, the first clutch 9 is in the disconnected state. The power of the engine 2 is thus not transmitted from the first shaft 7 to the speed changing mechanism 12. The planetary carrier shaft 54 receives the rotation of the first shaft 7 and rotates in the second rotational direction. The planetary gear 53 revolves in the second rotational direction (the arrow A4 direction in FIG. 3) around the sun gear 51. At this time, the second clutch 10 is in the blocking state. The sun gear 51 thus does not rotate. When the planetary carrier shaft 54 rotates in the second rotational direction, the second shaft 8 rotates together with the planetary carrier shaft 54 in the second rotational direction (the arrow A3 direction in FIG. 3). The rotational power of the second shaft 8 is input to the driven machine 4, and the driven machine 4 is driven.

Here, when current is caused to flow through the coil of the stator 32 to rotate the rotor 31 in the first rotational direction, the rotation of the rotor 31 is transmitted from the internal gear 52 to the planetary carrier shaft 54 via the planetary gear 53. Consequently, the second shaft 8 rotates together with the planetary carrier shaft 54 in the second rotational direction, and the rotational power of the second shaft 8 is input to the driven machine 4. Therefore, the driven machine 4 rotates by receiving, in addition to the power of the engine 2, the power by the rotation of the rotor 31 of the motor/generator 3. In other words, the motor/generator 3 can be actuated as an assist motor that assists power of the engine 2. In addition, since an electromotive force is generated in the coil of the stator 32 due to the rotation of the rotor 31, the motor/generator 3 can be actuated as a generator that generates power by the power of the engine 2.

In the power transmission mechanism 1, when the first clutch 9 is caused to be in the connected state and the first shaft 7 is rotated by driving the engine 2, the rotation of the first shaft 7 is increased in speed and transmitted to the internal gear 52 and the rotor 31 by the speed changing mechanism 12. In other words, when the first clutch 9 is in the connected state, the speed changing mechanism 12 is capable of increasing the speed of rotation of the first shaft 7 and transmitting the speed-increased rotation to the internal gear 52 and the rotor 31. Therefore, the rotational speed (the number of rotations) of the motor/generator 3 increases compared with the rotational speed (the number of rotations) of the engine 2, and the motor/generator 3 can be driven at higher-speed rotation than the engine 2. Therefore, the size of the motor/generator 3 is not required to be increased to cope with high-speed rotation, which enables downsizing of the motor/generator 3. Consequently, the amount of current required to rotate the motor/generator 3 at a high speed is reduced, and generation of heat of the motor/generator 3 decreases. As a result, efficiency of the motor/generator 3 is improved while a cooler for cooling the motor/generator 3 can be downsized.

As described above, the first clutch 9 can perform on-off switching of a starter function (function as a starter motor that starts the engine 2) of the motor/generator 3 in the power transmission mechanism 1. Specifically, when the first clutch 9 is caused to be in the connected state, the starter function can be executed. When the first clutch 9 is caused to be in the disconnected state, the starter function can be cancelled.

The second clutch 10 can perform on-off switching of an assist function (function as an assist motor that assists power of the engine 2) and a generator function (function as a generator that generates power by the power of the engine 2) of the motor/generator 3 in the power transmission mechanism 1. Specifically, when the second clutch 10 is caused to be in the blocking state, the assist function and the generator function can be executed. When the second clutch 10 is caused to be in the allowing state, the assist function and the generator function can be cancelled.

The second clutch 10 can perform switching between a state in which the engine 2 and the motor/generator 3 rotate synchronously at a constant rotational speed ratio and a state in which the engine 2 and the motor/generator 3 rotate non-synchronously in the power transmission mechanism 1. Specifically, when the second clutch 10 is caused to be in the blocking state, the engine 2 and the motor/generator 3 rotate synchronously at a constant rotational speed ratio. When the second clutch 10 is caused to be in the allowing state, the engine 2 and the motor/generator 3 rotate non-synchronously.

When used as a parallel hybrid power transmission mechanism, the power transmission mechanism 1 has a substantially inline configuration and has a compact configuration since the planetary gear mechanism 5 is disposed on the inner peripheral side of the rotor 31 of the motor/generator 3. When used as a series hybrid power transmission mechanism, the power transmission mechanism 1 does not need the second shaft 8 and thus has a further compact configuration.

In the power transmission mechanism 1, as each of the first clutch 9 and the second clutch 10, a clutch that transmits a rotational force regardless of the direction of rotation may be used and a one-way clutch that transmits a rotational force only in one direction may be used.

When a configuration (first configuration) in which a clutch that transmits a rotational force regardless of the direction of rotation is used as each of the first clutch 9 and the second clutch 10 is employed, switching of the first clutch 9 and the second clutch 10 is controlled by the controller 17.

When a configuration (second configuration) in which a one-way clutch that transmits a rotational force only in one direction is used as each of the first clutch 9 and the second clutch 10 is employed, switching of the first clutch 9 and the second clutch 10 can be automatically performed without depending on control by the controller 17. Hereinafter, this second configuration will be described in detail.

As the first clutch 9 and the second clutch 10, one-way clutches whose directions of transmitting a rotational force are opposite to each other are used. Specifically, the first clutch 9 enters the connected state when the rotor 31 rotates in the first rotational direction (refer to the arrow A1 in FIG. 2) and enters the disconnected state when the rotor 31 rotates in the second rotational direction (the arrow A5 direction in FIG. 3). The second clutch 10 enters the allowing state when the rotor 31 rotates in the first rotational direction and enters the blocking state when the rotor 31 rotates in the second rotational direction.

As described above, when the motor/generator 3 is actuated as a starter motor that starts the engine 2, the rotor 31 rotates in the first rotational direction (refer to the arrow A1 in FIG. 2). Then, the first clutch 9 enters the connected state, and the second clutch 10 enters the allowing state. When the motor/generator 3 is actuated as an assist motor that assists power of the engine 2 or as a generator that generates power by the power of the engine 2, the rotor 31 rotates in the first rotational direction (refer to the arrow A5 in FIG. 2). Then, the first clutch 9 enters the disconnected state, and the second clutch 10 enters the blocking state.

As above, according to the second configuration, switching of the first clutch 9 and the second clutch 10 can be automatically performed by switching of the rotation direction of the rotor 31. Therefore, by controlling the rotation direction of the rotor 31 by the controller 17, it is possible to automatically perform switching operation of the first clutch 9 and the second clutch 10.

It is preferably configured such that, when the rotor 31 rotates in the first rotational direction, the first clutch 9 enters the connected state before the number of rotations of the first shaft 7 reaches a predetermined number of the rotations and enters the disconnected state when the number of the rotations of the first shaft 7 reaches the predetermined number of the rotations. By employing such a configuration, it is possible to cause the rotational power of the motor/generator 3 to be transmitted to the first shaft 7 by causing the first clutch 9 to be in the connected state before the engine 2 is started and to cause the rotational power of the motor/generator 3 not to be transmitted to the first shaft 7 by causing the first clutch 9 to be in the disconnected state after the engine 2 is started and the predetermined number of the rotation is reached.

The hybrid power transmission mechanism 1 according to the aforementioned embodiment can exert the following effects.

The hybrid power transmission mechanism 1 includes the engine 2; the motor/generator 3 having the rotor 31 and the stator 32; the driven machine 4 to which power from the engine 2 and/or the motor/generator 3 is transmitted; the planetary gear mechanism 5 having the sun gear 51, the internal gear 52, the planetary gear 53 that meshes with the sun gear 51 and the internal gear 52, and the planetary carrier shaft 54 that supports the planetary gear 53 rotatably around the sun gear 51; the first clutch 9; and the second clutch 10. The planetary carrier shaft 54 includes the first extension shaft part 54*a* and the second extension shaft part 54*b* extending from the planetary gear 53 in opposite directions along the rotational axis direction of the planetary gear 53. The first shaft 7 that outputs power of the engine 2 is drivingly connected to the first extension shaft part 54*a* of the planetary carrier shaft 54. The second shaft 8 that inputs power to the driven machine 4 is drivingly connected to the second extension shaft part 54*b* of the planetary carrier shaft 54. The internal gear 52 is drivingly connected to the rotor 31. The first clutch 9 is switchable between the connected state of allowing transmission of power between the first shaft 7 and the internal gear 52 and the disconnected state of not allowing transmission of power between the first shaft 7 and the internal gear 52. The second clutch 10 is switchable between the allowing state of allowing rotation of the sun gear 51 and the blocking state of not allowing the rotation of the sun gear.

According to this configuration, by switching the first clutch 9 and the second clutch 10, it is possible to easily and reliably switch between a state in which the motor/generator 3 functions as a starter motor and a state in which the motor/generator 3 functions as an assist motor or as a generator. In detail, by causing the first clutch 9 to be in the connected state and causing the second clutch 10 to be in the allowing state, the motor/generator 3 is caused to be in a state of functioning as a starter motor. In addition, by causing the first clutch 9 to be in the disconnected state and causing the second clutch 10 to be in the blocking state, the motor/generator 3 is caused to be in a state of functioning as an assist motor or as a generator. Further, since the hybrid power transmission mechanism 1 is configured by a combination of the planetary gear mechanism 5 and the first clutch 9 and the second clutch 10, the above-described switching function can be realized with a compact configuration.

Also, the hybrid power transmission mechanism 1 includes the speed changing mechanism 12 that reduces the speed of rotation of the internal gear 52 and transmits the speed-reduced rotation of the internal gear 52 to the first shaft 7 when the first clutch 9 is in the connected state.

According to this configuration, the rotational torque of the first shaft 7 increases compared with the rotational torque of the motor/generator 3. Therefore, rotational power having high torque is input from the first shaft 7 to the engine 2, which makes it possible to reliably start the engine 2. Therefore, actuating the motor/generator 3 as a starter motor does not require the use of a large motor/generator 3 having high output torque, which enables downsizing of the motor/generator 3.

Also, the speed changing mechanism 12 is capable of increasing the speed of rotation of the first shaft 7 and transmitting the speed-increased rotation of the first shaft 7 to the internal gear 52 when the first clutch 9 is in the connected state.

According to this configuration, the rotational speed (the number of rotations) of the motor/generator 3 increases compared with the rotational speed (the number of rotations) of the engine 2, and the motor/generator 3 can be driven at higher-speed rotation than the engine 2. Therefore, the size of the motor/generator 3 is not required to be increased to cope with high-speed rotation, which enables downsizing of the motor/generator 3. Consequently, generation of heat of the motor/generator 3 decreases, and it is possible to achieve an improvement in efficiency of the motor/generator 3 and downsizing of a cooler for cooling the motor/generator 3.

Also, the speed changing mechanism 12 has the first gear 13, the second gear 14 that is drivingly connected to the first gear 13 and rotates synchronously with the first gear 13, and the third gear 15 that has a larger number of teeth than the second gear 14 and meshes with the second gear 14. The first gear 13 meshes with the internal gear 52. The third gear 15 is capable of being drivingly connected to the first shaft 7 via the first clutch 9.

According to this configuration, the speed changing mechanism 12 can have a compact configuration while speed changing by the speed changing mechanism 12 can be reliably performed.

Also, the internal gear 52 has the first internal teeth 52a and the second internal teeth 52b. The first internal teeth 52a mesh with the first gear 13. The second internal teeth 52b mesh with the planetary gear 53.

According to this configuration, power transmission with respect to the first gear 13 and power transmission with respect to the planetary gear 53 can be performed by the single internal gear 52, which enables downsizing of the hybrid power transmission mechanism 1.

Also, the hybrid power transmission mechanism 1 includes the controller 17 that controls operation of the first clutch 9 and the second clutch 10. The controller 17 causes the first clutch 9 to be in the connected state and causes the second clutch 10 to be in the allowing state when the motor/generator 3 is actuated as a starter motor that starts the engine 2. The controller 17 causes the first clutch 9 to be in the disconnected state and causes the second clutch 10 to be in the blocking state when the motor/generator 3 is actuated as an assist motor that assists power of the engine 2 or as a generator that generates power by the power of the engine 2.

According to this configuration, a state in which the motor/generator 3 functions as a starter motor and a state in which the motor/generator 3 functions as an assist motor or as a generator can be reliably and easily switched by control by the controller 17.

Also, each of the first clutch 9 and the second clutch 10 is a one-way clutch. The rotor 31 rotates in the first direction when the motor/generator 3 is actuated as a starter motor that starts the engine 2 and rotates in the second direction when the motor/generator 3 is actuated as an assist motor that assists power of the engine 2 or as a generator that generates power by the power of the engine 2. The first clutch 9 enters the connected state when the rotor 31 rotates in the first direction and enters the disconnected state when the rotor 31 rotates in the second direction. The second clutch 10 enters the allowing state when the rotor 31 rotates in the first direction and enters the blocking state when the rotor 31 rotates in the second direction.

According to this configuration, switching of the first clutch 9 and the second clutch 10 can be automatically performed by switching of the rotation direction of the rotor 31. Therefore, it is possible to perform switching operation of the first clutch 9 and the second clutch 10 without depending on control by the controller 17.

Also, when the rotor 31 rotates in the first direction, the first clutch 9 enters the connected state before the number of rotations of the first shaft 7 reaches a predetermined number of the rotations and enters the disconnected state when the number of the rotations of the first shaft 7 reaches the predetermined number of the rotations.

According to this configuration, it is possible to cause the rotational power of the motor/generator 3 to be transmitted to the first shaft 7 before the engine 2 is started and to cause the rotational power of the motor/generator 3 not to be transmitted to the first shaft 7 after the engine 2 is started and the predetermined number of the rotations is reached.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A hybrid power transmission mechanism comprising:
an engine;
a motor/generator having a rotor and a stator;
a driven machine to which power from the engine and/or the motor/generator is to be transmitted;
a planetary gear mechanism having a sun gear, an internal gear, a planetary gear that meshes with the sun gear and the internal gear, and a planetary carrier shaft that supports the planetary gear rotatably around the sun gear;
a first clutch; and
a second clutch,
wherein the planetary carrier shaft includes a first extension shaft part and a second extension shaft part extending from the planetary gear in opposite directions along a rotational axis direction of the planetary gear,
wherein a first shaft that outputs power of the engine is drivingly connected to the first extension shaft part of the planetary carrier shaft,
wherein a second shaft that inputs power to the driven machine is drivingly connected to the second extension shaft part of the planetary carrier shaft,
wherein the internal gear is drivingly connected to the rotor,
wherein the first clutch is switchable between a connected state of allowing transmission of power between the first shaft and the internal gear and a disconnected state of not allowing transmission of power between the first shaft and the internal gear,
wherein the second clutch is switchable between an allowing state of allowing rotation of the sun gear and a blocking state of not allowing rotation of the sun gear, and
wherein the hybrid power transmission mechanism comprises a speed changing mechanism that reduces a speed of rotation of the internal gear and transmits the speed-reduced rotation of the internal gear to the first shaft when the first clutch is in the connected state.

2. The hybrid power transmission mechanism according to claim 1,
wherein the speed changing mechanism is capable of increasing the speed of rotation of the first shaft and transmitting the speed-increased rotation of the first shaft to the internal gear when the first clutch is in the connected state.

3. The hybrid power transmission mechanism according to claim 1,
wherein the speed changing mechanism has a first gear, a second gear that is drivingly connected to the first gear and rotates synchronously with the first gear, and a third gear that has a larger number of teeth than the second gear and meshes with the second gear,
wherein the first gear meshes with the internal gear, and
wherein the third gear is capable of being drivingly connected to the first shaft via the first clutch.

4. The hybrid power transmission mechanism according to claim 3,
wherein the internal gear has first internal teeth and second internal teeth,
wherein the first internal teeth mesh with the first gear, and
wherein the second internal teeth mesh with the planetary gear.

5. A hybrid power transmission mechanism according to claim 1, comprising:
an engine;
a motor/generator having a rotor and a stator;
a driven machine to which power from the engine and/or the motor/generator is to be transmitted;
a planetary gear mechanism having a sun gear, an internal gear, a planetary gear that meshes with the sun gear and the internal gear, and a planetary carrier shaft that supports the planetary gear rotatably around the sun gear;
a first clutch; and
a second clutch, and
a controller that controls operation of the first clutch and the second clutch,
wherein the planetary carrier shaft includes a first extension shaft part and a second extension shaft part extending from the planetary gear in opposite directions along a rotational axis direction of the planetary gear,
wherein a first shaft that outputs power of the engine is drivingly connected to the first extension shaft part of the planetary carrier shaft,
wherein a second shaft that inputs power to the driven machine is drivingly connected to the second extension shaft part of the planetary carrier shaft,
wherein the internal gear is drivingly connected to the rotor,
wherein the first clutch is switchable between a connected state of allowing transmission of power between the first shaft and the internal gear and a disconnected state of not allowing transmission of power between the first shaft and the internal gear,
wherein the second clutch is switchable between an allowing state of allowing rotation of the sun gear and a blocking state of not allowing rotation of the sun gear, and
wherein the controller
causes the first clutch to be in the connected state and causes the second clutch to be in the allowing state when the motor/generator is actuated as a starter motor that starts the engine, and
causes the first clutch to be in the disconnected state and causes the second clutch to be in the blocking state when the motor/generator is actuated as an assist motor that assists power of the engine or as a generator that generates power by the power of the engine.

6. A hybrid power transmission mechanism comprising:
an engine;
a motor/generator having a rotor and a stator;
a driven machine to which power from the engine and/or the motor/generator is to be transmitted;
a planetary gear mechanism having a sun gear, an internal gear, a planetary gear that meshes with the sun gear and the internal gear, and a planetary carrier shaft that supports the planetary gear rotatably around the sun gear;
a first clutch; and
a second clutch,
wherein the planetary carrier shaft includes a first extension shaft part and a second extension shaft part extending from the planetary gear in opposite directions along a rotational axis direction of the planetary gear,
wherein a first shaft that outputs power of the engine is drivingly connected to the first extension shaft part of the planetary carrier shaft,
wherein a second shaft that inputs power to the driven machine is drivingly connected to the second extension shaft part of the planetary carrier shaft,
wherein the internal gear is drivingly connected to the rotor,
wherein the first clutch is switchable between a connected state of allowing transmission of power between the first shaft and the internal gear and a disconnected state of not allowing transmission of power between the first shaft and the internal gear,
wherein the second clutch is switchable between an allowing state of allowing rotation of the sun gear and a blocking state of not allowing rotation of the sun gear,
wherein each of the first clutch and the second clutch is a one-way clutch,
wherein the rotor rotates in a first direction when the motor/generator is actuated as a starter motor that starts the engine and rotates in a second direction when the motor/generator is actuated as an assist motor that assists power of the engine or as a generator that generates power by the power of the engine,
wherein the first clutch enters the connected state when the rotor rotates in the first direction and enters the disconnected state when the rotor rotates in the second direction, and
wherein the second clutch enters the allowing state when the rotor rotates in the first direction and enters the blocking state when the rotor rotates in the second direction.

7. The hybrid power transmission mechanism according to claim 6,
wherein, when the rotor rotates in the first direction, the first clutch enters the connected state before a rotational speed of the first shaft reaches a predetermined rotational speed and enters the disconnected state when the rotational speed of the first shaft reaches the predetermined rotational speed.

* * * * *